US012646999B2

(12) United States Patent
He

(10) Patent No.: US 12,646,999 B2
(45) Date of Patent: Jun. 2, 2026

(54) IC ASSEMBLING STRUCTURE FOR BRUSHLESS MOTOR OF PORTABLE FAN

(71) Applicant: Guangdong Wanyi Electronics Co., Ltd., Huizhou (CN)

(72) Inventor: Shunwan He, Dao (CN)

(73) Assignee: Guangdong Wanyi Electronics Co., Ltd., Huizhou (CN)

( * ) Notice: Subject to any disclaimer, the term of this patent is extended or adjusted under 35 U.S.C. 154(b) by 0 days.

(21) Appl. No.: 19/349,110

(22) Filed: Oct. 3, 2025

(65) Prior Publication Data

US 2026/0031684 A1 Jan. 29, 2026

(30) Foreign Application Priority Data

May 22, 2025 (CN) .......................... 202521019529.8

(51) Int. Cl.
 *H02K 11/00* (2016.01)
 *H02K 1/14* (2006.01)
 *H02K 11/215* (2016.01)
(52) U.S. Cl.
 CPC ......... *H02K 11/0094* (2013.01); *H02K 1/146* (2013.01); *H02K 11/215* (2016.01); *H02K 2211/03* (2013.01)
(58) Field of Classification Search
 CPC .. H02K 11/0094; H02K 11/215; H02K 1/146; H02K 2211/03
 See application file for complete search history.

(56) References Cited

U.S. PATENT DOCUMENTS

| | | | | |
|---|---|---|---|---|
| 4,806,808 | A * | 2/1989 | Grecksch | H05K 1/183 310/67 R |
| 7,812,488 | B2 * | 10/2010 | Cosco | H02K 29/08 257/659 |
| 2014/0091834 | A1 | 4/2014 | Chi | |
| 2021/0020736 | A1 | 1/2021 | Paul | |
| 2021/0366797 | A1 | 11/2021 | Wang et al. | |

FOREIGN PATENT DOCUMENTS

JP 7418146 B1 * 1/2024 ........... H02K 11/215

* cited by examiner

*Primary Examiner* — Terrance L Kenerly
(74) *Attorney, Agent, or Firm* — Hemisphere Law, PLLC

(57) ABSTRACT

An integrated circuit (IC) assembling structure for a brushless motor of a portable fan is provided, including a printed circuit board (PCB) and a motor stator fixedly arranged on one side of the PCB; the motor stator includes a plurality of windings; the plurality of windings are arranged uniformly around a center axis of the motor stator; a first position-providing gap is at least provided in an edge of the PCB; the PCB is electrically connected with a Hall IC; the Hall IC is arranged in an axial projection region of the first position-providing gap; a pin of the Hall IC extends towards a middle region of the PCB and is electrically connected to the PCB; and the Hall IC is laid flatly on a side of the PCB facing away from the motor stator. Automatic machining and production can be implemented.

4 Claims, 4 Drawing Sheets

IC ASSEMBLING STRUCTURE FOR BRUSHLESS MOTOR OF PORTABLE FAN

TECHNICAL FIELD

The present disclosure relates to the technical field of brushless motors, and in particular, to an integrated circuit (IC) assembling structure for a brushless motor of a portable fan.

BACKGROUND

The working principle of a brushless motor is based on an electronic commutation technology. A plurality of windings are arranged inside the motor, and rotation of the motor is implemented by controlling a power-on sequence and time of these windings. A position detector (such as a Hall IC) detects a position of a rotor and transmits the position signal to the IC. The IC generates a switching signal based on these signals to control an on or off state of a power transistor, thereby controlling running of the motor. In this way, the brushless motor can be efficiently and precisely controlled.

The Hall IC is usually placed at a midpoint position between two adjacent phases of windings of a stator, matches a distance between magnetic poles of the rotor, and is spaced apart by ½ of a pole pitch.

The brushless motor currently applied to the portable fan is usually provided with a Hall IC. There are two conventional ways to assemble the Hall IC with a printed circuit board (PCB). In one way, a pin through hole is formed in the PCB, and a pin on the Hall IC is fixed and electrically connected through soldering after passing through the pin through hole. In this way, the Hall IC extends towards a side on which a stator winding is located, which can effectively shorten a sensing distance and improve sensing sensitivity. However, this structure has high requirements for standardization and accuracy, so that automatic production cannot be implemented. The production efficiency is low. Furthermore, the Hall IC may be skewed after being assembled, which seriously affects the appearance and regularity of a finished product. Meanwhile, the Hall IC may also be interfered by magnetic interferences in different degrees, refer to FIG. 3 in this specification. In the other way, the Hall IC is laid flatly on a side of the PCB facing away from the stator winding. This assembling way can implement automatic production and improve the production efficiency. However, since the Hall IC is far away from the stator winding, the sensing sensitivity is low, refer to FIG. 4 in this specification.

SUMMARY

The present disclosure aims to provide an IC assembling structure for a brushless motor of a portable fan, which can implement automatic machining and production. Meanwhile, after being assembled, a Hall IC has a normal form and is accurately positioned. The sensitivity of sensing of the Hall IC can be effectively ensured, and the problems mentioned in the background section are solved.

To achieve the above objectives, the present disclosure provides the following technical solutions: An IC assembling structure for a brushless motor of a portable fan includes a PCB and a motor stator fixedly arranged on one side of the PCB; the motor stator includes a plurality of windings; the plurality of windings are arranged uniformly around a center axis of the motor stator; a first position-providing gap is at least provided in an edge of the PCB; the PCB is electrically connected with a Hall IC; the Hall IC is arranged in an axial projection region of the first position-providing gap; a pin of the Hall IC extends towards a middle region of the PCB and is electrically connected to the PCB; and the Hall IC is laid flatly on a side of the PCB facing away from the motor stator.

Preferably, the first position-providing gap is arranged in a manner of corresponding to a midpoint position between two adjacent phases of windings of the motor stator.

Preferably, when the Hall IC is subjected to an external force towards the side on which the motor stator is located, a pin of the Hall IC deforms, eventually crosses the first position-providing gap, and is perpendicular to the PCB.

Preferably, a second position-providing gap is provided in an edge of the PCB; and the second position-providing gap is arranged in a mirror image region of the first position-providing gap by using a center axis of the PCB as a symcenter.

Preferably, a plurality of first position-providing gaps are provided.

Compared with the prior art, the present disclosure has the beneficial effects:

The present disclosure can implement automatic machining and production. Meanwhile, after being assembled, the Hall IC has a normal form and is accurately positioned. The sensitivity of sensing of the Hall IC can be effectively ensured.

Figure 1:
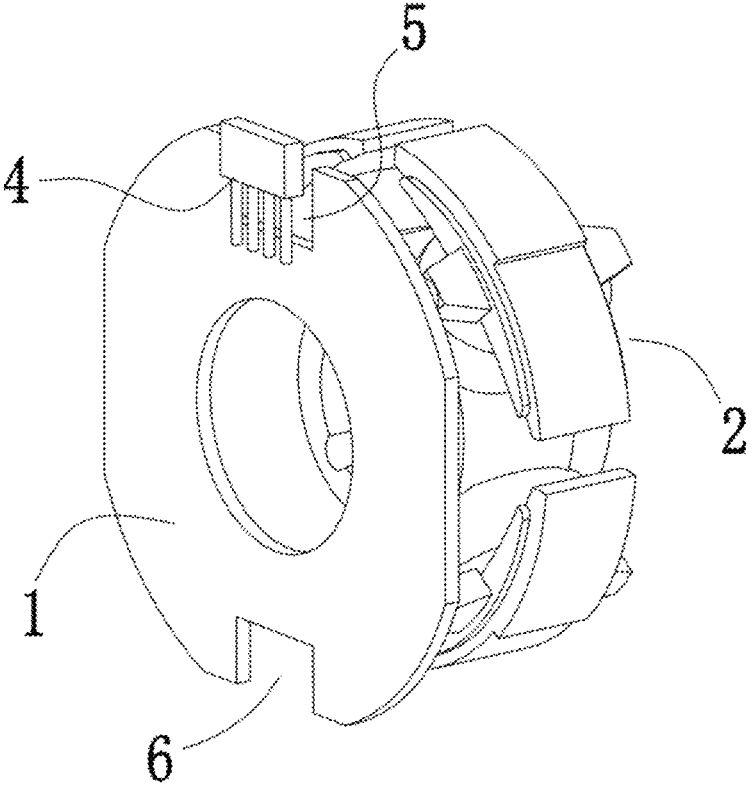
FIG. 1 is a first schematic structural diagram of the present disclosure.

In the drawings: 1: PCB; 2: motor stator; 3: winding; 4: Hall IC; 5: first position-providing gap; and 6: second position-providing gap.

DETAILED DESCRIPTION OF THE EMBODIMENTS

The technical solutions in the embodiments of the present disclosure are clearly and completely described below with reference to the accompanying drawings in the embodiments of the present disclosure. Apparently, the described embodiments are merely some embodiments of the present disclosure, rather than all of the embodiments. All other embodiments obtained by a person of ordinary skill in the art based on the embodiments of the present disclosure without making creative efforts shall fall within the protection scope of the present disclosure.

Figure 2:
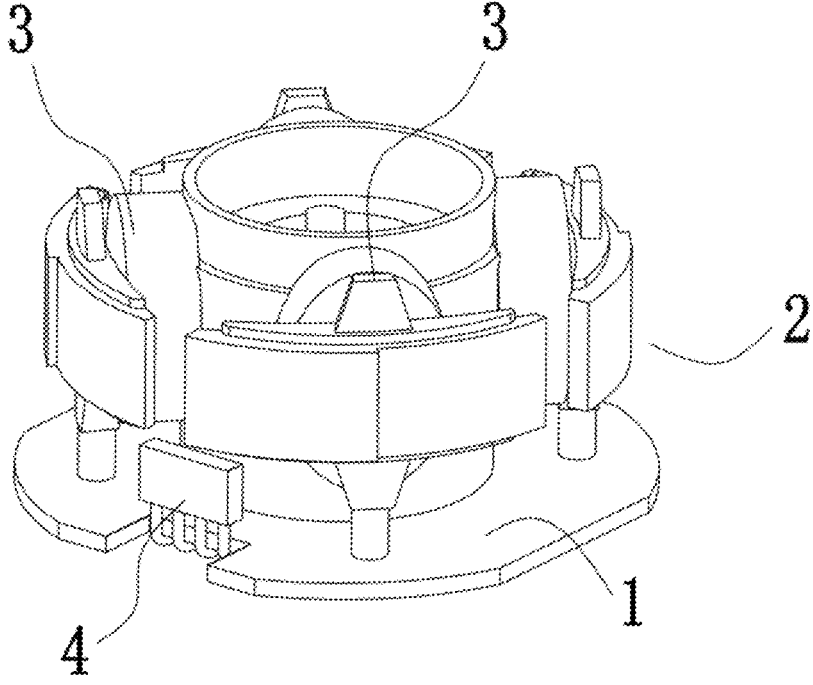
FIG. 2 is a second schematic structural diagram of the present disclosure.
Figure 3:
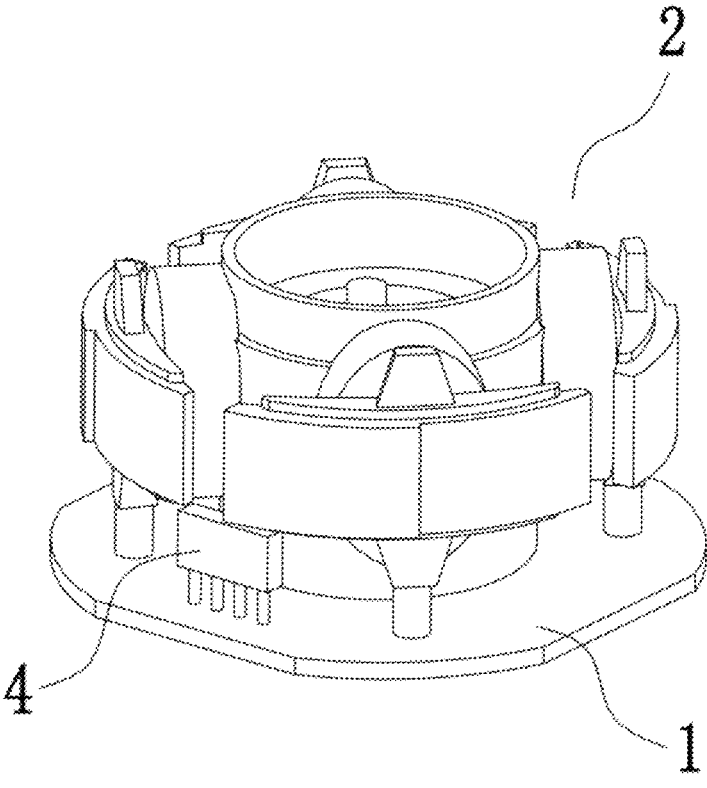
FIG. 3 is a schematic structural diagram of Embodiment I of the existing art of the present disclosure.
Figure 4:
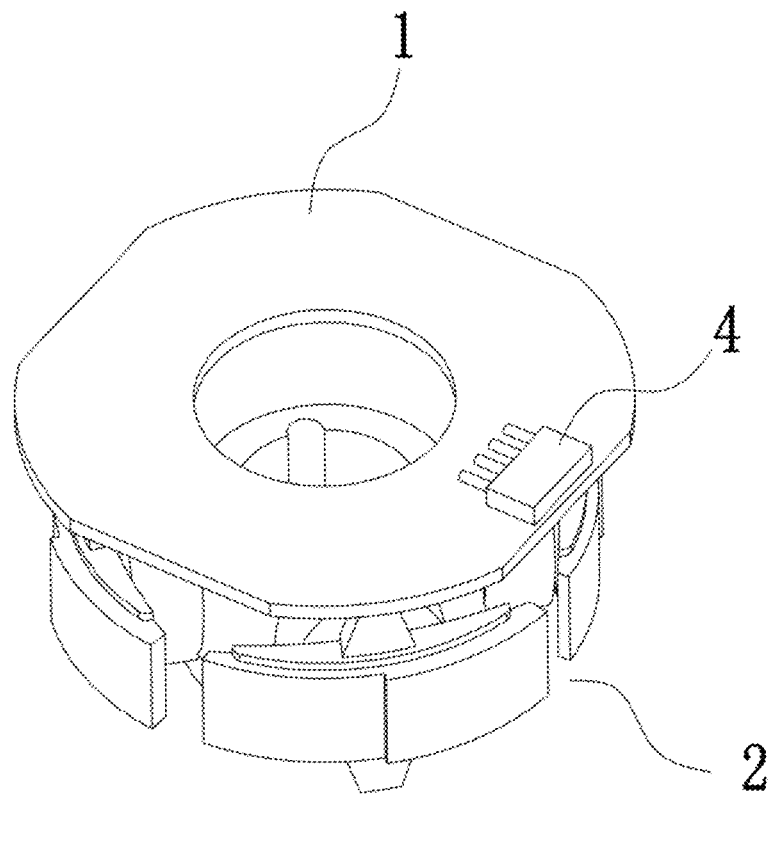
FIG. 4 is a schematic structural diagram of Embodiment II of the existing art of the present disclosure.

Referring to FIG. 1 to FIG. 2, an IC assembling structure for a brushless motor of a portable fan includes a PCB 1 and a motor stator 2 fixedly arranged on one side of the PCB 1. The motor stator 2 includes a plurality of windings 3. The plurality of windings 3 are arranged uniformly around a center axis of the motor stator 2. A first position-providing gap 5 is at least provided in an edge of the PCB 1. The first position-providing gap 5 is arranged in a manner of corresponding to a midpoint position between two adjacent phases of windings of the motor stator 2. The PCB 1 is electrically connected with a Hall IC 4. The Hall IC 4 is arranged in an axial projection region of the first position-providing gap 5, and a pin of the Hall IC 4 extends towards a middle region of the PCB 1 and is electrically connected to the PCB 1. The Hall IC 4 is laid flatly on a side of the PCB 1 facing away from the motor stator 2. When the Hall IC 4 is subjected to an external force towards the side on which the motor stator 2 is located, a pin of the Hall IC 4 deforms, eventually crosses the first position-providing gap 5, and is perpendicular to the PCB 1.

A second position-providing gap 6 is provided in an edge of the PCB 1. The second position-providing gap 6 is arranged in a mirror image region of the first position-providing gap 5 by using a center axis of the PCB 1 as a symcenter. During arrangement of a plurality of motor PCBs on the same board, the second position-providing gap 6 can be configured to provide a position-providing space for bending forming of the Hall IC 4. A plurality of first position-providing gaps 5 can be provided according to an actual need. When the plurality of first position-providing gaps 5 are provided, a plurality of second position-providing gaps 6 can be correspondingly provided, to meet a requirement for PCB machining and arrangement.

During actual production and machining, a plurality of motor PCBs 1 can be simultaneously arranged on a PCB with a large area. This approach is to improve the production efficiency and increase the utilization rate of the PCB. The arrangement manner in which one board holds a plurality of motor PCBs is a conventional production process in the field of electronic machining. During automatic production, the Hall IC 4 is conveyed to a specified position through automatic production equipment, and then the Hall IC 4 is fixedly arranged on the PCB 1 by using a spot welding technology. After the Hall IC 4 is correctly fixed on the PCB 1, the Hall IC 4 is pressed through a die pressing jig and bends 90 degrees by crossing the PCB 1. In this case, the assembling operation on the Hall IC 4 is completed.

In conclusion, the present disclosure can implement automatic machining and production. Meanwhile, after being assembled, the Hall IC has a normal form and is accurately positioned. The sensitivity of sensing of the Hall IC 4 can be effectively ensured.

It should be noted that in this document, relationship terms such as first and second are used solely to distinguish one entity or operation from another entity or operation without necessarily requiring or implying any actual such relationship or order between such entities or operations. Furthermore, the terms "include", "including", or any other variation thereof, are intended to encompass a non-exclusive inclusion, such that a process, method, article, or device that includes a list of elements does not include only those elements but may include other elements not explicitly listed or inherent to such process, method, article, or device.

Although the embodiments of the present disclosure have been shown and described, it can be understood by those of ordinary skill in the art that various changes, modifications, substitutions, and variations can be made to these embodiments without departing from the principle and spirit of the present disclosure. The scope of the present disclosure is defined by the accompanying claims and their equivalents.

What is claimed is:

1. An integrated circuit (IC) assembling structure for a brushless motor of a portable fan, comprising a printed circuit board (PCB) (1) and a motor stator (2) fixedly arranged on one side of the PCB (1), wherein the motor stator (2) comprises a plurality of windings (3); the plurality of windings (3) are arranged uniformly around a center axis of the motor stator (2); a first position-providing gap (5) is at least provided in an edge of the PCB (1); the PCB (1) is electrically connected with a Hall IC (4); the Hall IC (4) is arranged in an axial projection region of the first position-providing gap (5); a pin of the Hall IC (4) extends towards a middle region of the PCB (1) and is electrically connected to the PCB (1);

wherein when the Hall IC (4) is subjected to an external force towards the side on which the motor stator (2) is located, a pin of the Hall IC (4) deforms, eventually crosses the first position-providing gap (5), and is perpendicular to the PCB (1).

2. The IC assembling structure for the brushless motor of the portable fan according to claim 1, wherein the first position-providing gap (5) is arranged in a manner of corresponding to a midpoint position between two adjacent phases of windings of the motor stator (2).

3. The IC assembling structure for the brushless motor of the portable fan according to claim 1, wherein a second position-providing gap (6) is provided in an edge of the PCB (1); and the second position-providing gap (6) is arranged in a mirror image region of the first position-providing gap (5) by using a center axis of the PCB (1) as a symcenter.

4. The IC assembling structure for the brushless motor of the portable fan according to claim 1, wherein a plurality of first position-providing gaps (5) are provided.

* * * * *